July 12, 1938.   H. HIERTA   2,123,305
MOTOR VEHICLE
Filed June 20, 1934   2 Sheets-Sheet 1
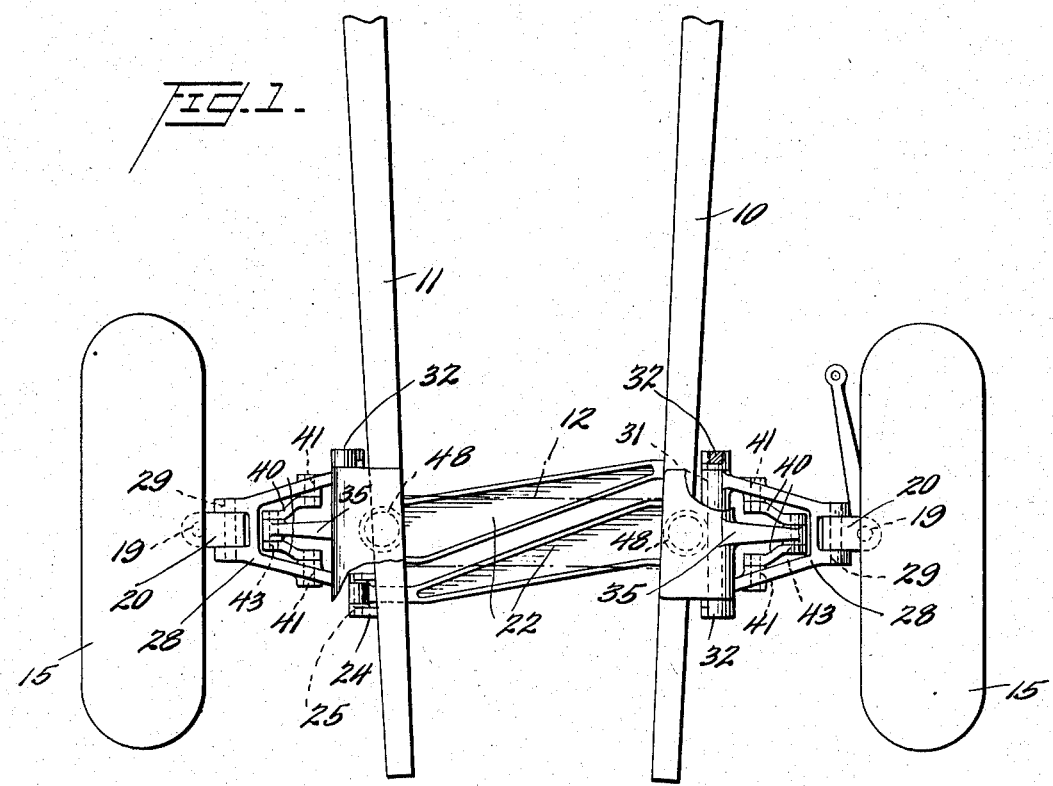
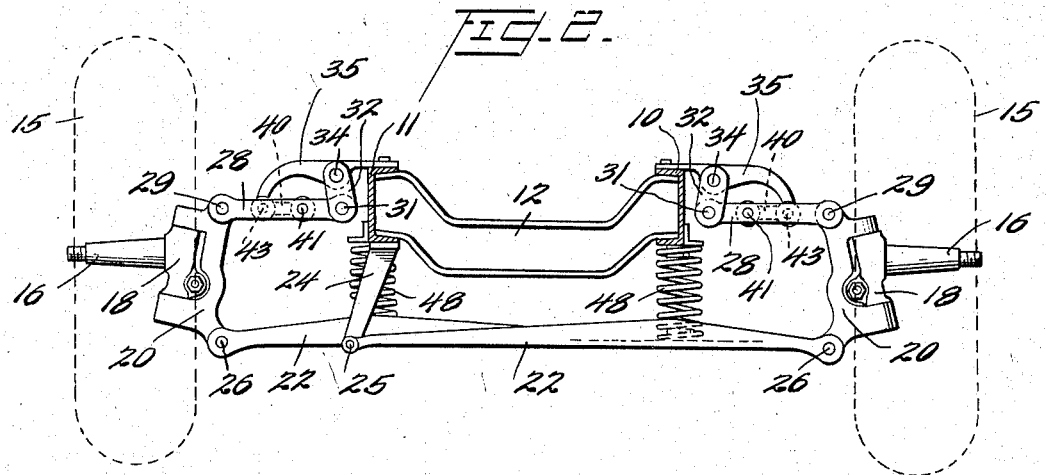
Inventor
Hans Hierta
By Watson, Coit, Morse & Grindle
Attorney July 12, 1938.  H. HIERTA  2,123,305
MOTOR VEHICLE
Filed June 20, 1934  2 Sheets-Sheet 2
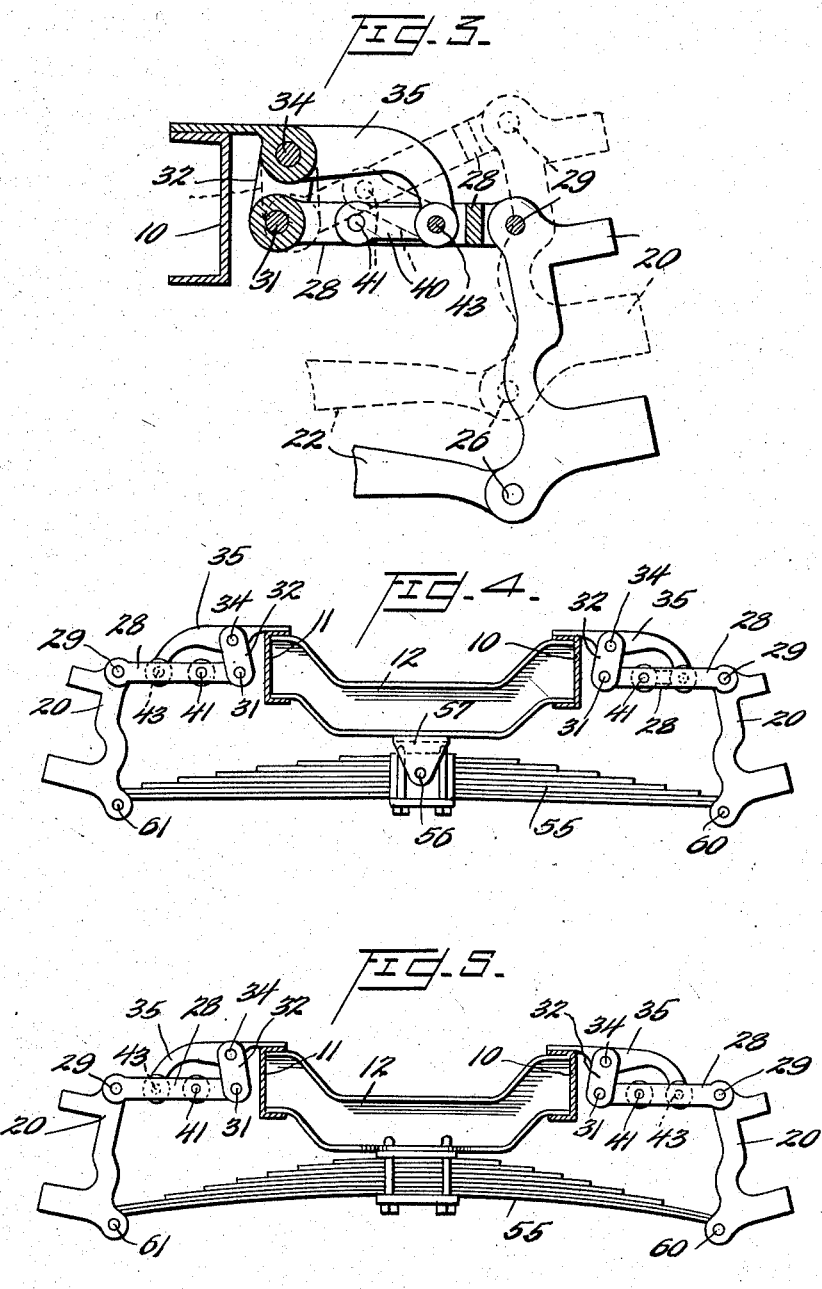

Patented July 12, 1938

2,123,305

UNITED STATES PATENT OFFICE 2,123,305

MOTOR VEHICLE

Hans Hierta, Dearborn, Mich.

Application June 20, 1934, Serial No. 731,565

18 Claims. (Cl. 267—20)

This invention relates to motor vehicles and more particularly to means whereby the vehicle road wheels are supported for rising and falling movement and in the case of steerable road wheels for steering movement, with respect to the vehicle frame.

In its preferred form the invention is concerned with wheel suspensions of the type commonly referred to as independent, each of two road wheels at opposite sides of the vehicle being capable of executing rising and falling movement with respect to the vehicle without affecting the relationship of the opposite road wheel and the vehicle frame.

It is the principal object of the invention to provide a wheel suspension in which the wheels always remain substantially parallel to the longitudinal vertical plane of the vehicle frame and body regardless of any rising and falling movement of which the wheels may partake and in which the central portion of the tire tread always engages the ground when the vehicle is being driven straight ahead, there being no lateral displacement of the tread as the wheels rise and fall, with consequent reduction of wear. Since there is practically no change of the plane in which the wheels rotate as the result of rising and falling movement, no gyroscopic force is developed such as is possibly responsible for the development of shimmy. Any tendency of the vehicle to turn to one side or the other in passing over a rough road bed is also substantially eliminated.

It is a more specific object of the invention to provide, in an independent wheel suspension of the type employing parallel links pivoted to the frame and to the vehicle wheel assembly, a construction in which at least one of the links is supported on the frame for bodily lateral displacement as the link swings in either direction from a mid-position, the link being guided so as to follow a definite predetermined path. By means of this arrangement objectionable lateral movement of that end of the link which is pivoted to the wheel assembly can be substantially or entirely avoided, the bodily displacement of the point of pivotal connection of the link to the frame compensating for the inward movement of the outer end of the link as the latter rises and falls in the usual arcuate path.

In the preferred embodiment of the invention only the upper link is constructed as hereinbefore described, it being possible to carry the lower link across the vehicle frame so that the link may be made sufficiently long to ensure substantially vertical movement of that end which is pivoted to the wheel assembly.

Further objects and features of the invention will be apparent from the following description taken in connection with the accompanying drawings, in which Figure 1 is a plan view of the forward portion of a vehicle frame illustrating one embodiment of the invention;

Figure 2 is an end elevation of the construction shown in Figure 1 with portions of the frame shown in section;

Figure 3 is a fragmentary enlarged sectional view of a portion of the structure shown in Figure 2 illustrating two different positions of the elements; and Figures 4 and 5 are end elevations illustrating slightly modified constructions.

In order to facilitate an understanding of the invention, specific language is employed in describing the various elements shown in the drawings and constituting the preferred form of the invention. It will nevertheless be understood that no limitation of the invention is thereby intended and that various alterations and changes are contemplated such as fall within the scope of the invention. Furthermore, while the invention has been illustrated as applied to the steerable road wheels at the forward end of the vehicle, it will be appreciated from the following description that the invention is applicable to road wheels which are not steerable, such as the rear driving wheels.

The vehicle frame is represented as comprising the usual side frame members 10 and 11 and a cross frame member 12, the latter extending between and being secured to the side frame members in any convenient manner. The wheel suspension is generally of the pivoted link type and the construction is substantially identical at opposite sides of the vehicle. It will therefore suffice to describe the structure at one side of the vehicle only, similar reference characters being used to designate similar parts at opposite sides.

Thus each road wheel 15 is journalled for rotation on the wheel spindle 16, the latter being formed integrally with a steering knuckle 18 which is journalled for steering movement on a road wheel carrying member 20, the usual king pin 19 serving as the steering fulcrum for the wheel. The axis of steering movement of the wheel preferably approaches the vertical, it being understood that the precise disposition of this axis is not material, inclination of the axis being preferably employed to afford the usual wheel camber or to provide the conventional caster effect or both. The structure thus far described is conventional and the details thereof form no essential part of the present invention.

A lower link 22 is associated with each of the wheel carrying members 20 and is pivotally connected with the latter and with the frame; for instance a bracket 24 secured to one side frame member and depending therefrom may afford a fulcrum 25 for the inner end of the wheel supporting link and the link may be pivoted as at 26 to the wheel carrying member adjacent the lower end of the latter. A forked upper link 28 is pivoted as at 29 to the upper portion of each of the wheel carrying members 20, this link being pivoted at its inner end as indicated at 31 to members 32 which are in turn pivoted as at 34 to a bracket 35 rigidly secured to the adjacent side frame member.

The axes of pivotal connection 25, 26, 29, and 31 at the opposite ends of the links 22 and 28 and the fulcrum 34 of the members 32 are parallel to each other and are shown in the drawings as horizontal and as parallel to the center line of the vehicle. The disposition of these axes is not, however, essential to the practice of the invention so long as their parallel relationship is maintained. Thus the pivotal axes for the links associated with either road wheel may be inclined in a horizontal plane with respect to the vertical plane containing the longitudinal axis of the vehicle and/or these axes may be inclined with respect to a horizontal plane. It will therefore be understood that when the axes are described as substantially horizontal, such language is employed in a sense sufficiently broad to include alterations in the construction of the character indicated.

It will be observed that in the structure thus far described the link 28 is supported for concurrent swinging movement in a generally vertical plane and for bodily lateral displacement, the inner fulcrum 31 of this link being freely shiftable in a generally outward direction from the position which it occupies in Figures 2 and 3 of the drawings. This position is preferably the normal or midposition of the wheel and the wheel supporting links, it being understood that the wheel may either rise or fall from the position which the wheel occupies under normal conditions of loading. It will also be observed that in the normal or midposition of the wheel the links 22 and 28 are disposed substantially horizontally, and while this is ordinarily a desirable arrangement, it is not essential to the invention since under some circumstances it may be found preferable to employ links which are inclined either downwardly or upwardly in the midposition of the wheel.

Means are provided for guiding the link 28 through a definite and predetermined path, the extent of bodily displacement of the link laterally of the vehicle being determined by the extent to which the link is swung from the normal or midposition thereof. This means may comprise a member 40 which is pivoted to the link 28 as indicated at 41 and outwardly thereof to the bracket 35 as indicated at 43, the pivotal axes 41 and 43 being substantially parallel to the pivotal axes 29 and 31 of the link 28. In the preferred form of the invention the member 40 is formed to provide two arms and is located substantially in the plane of the link 28 when the latter occupies the midposition, the link 28 being forked as hereinbefore indicated to embrace the member 40 as shown more particularly in Figure 1 of the drawings, each arm of the member 40 being pivotally connected to the adjacent arm of the forked link. It will be understood, however, that this arrangement while quite compact and convenient is not essential in order that the desired result may be attained, it being possible to locate the member 40 either above or below the plane defined by the pivotal axes 29 and 31 of the link 28.

It will be seen that each of the lower links 22 is extended across the center line of the vehicle and is fulcrumed at the opposite side of the vehicle from that on which the associated road wheel is located in order to ensure that the link will be sufficiently long to permit rising and falling movement of the outer end thereof substantially in a vertical plane. In order to accommodate the two links it is therefore preferable to arrange the fulcrums 25 for the links in transverse planes which are spaced longitudinally of the vehicle as illustrated more clearly in Figure 1, one link thus being disposed forwardly of the other link. Coil springs 48 act between each of the side frame members 10 and 11 and the lower links 22, suitable spring seats being provided on the links and the side frame member, these coil springs constituting preferably the sole means of yieldingly resisting upward movement of the road wheels with respect to the frame.

From the foregoing description the mode of operation of the invention will be apparent. As either road wheel rises and falls, the lower portion of the wheel carrying member 20 will move upwardly in substantially a straight line by reason of the length of the lower link 22. The upper portion of each wheel carrying member will likewise move in substantially a straight line by reason of the fact that a portion of the link 28 intermediate the ends thereof is constrained to follow an arcuate path by means of the member 40, the axis 41 of pivotal connection between the member 40 and the link moving outwardly when the road wheel either rises or falls from the midposition thereof, the position which the wheel carrying member occupies when it is displaced upwardly from the normal or midposition being clearly illustrated in dotted lines in Figure 3 of the drawings. It is of course possible by varying the length and relationship of the member 40 and the link 28 to obtain any desired variation in the nature of the movement of which the wheel partakes as it rises and falls. I prefer, however, to ensure that the least possible tilting of the plane of the road wheel will occur. For instance in the form of the invention shown in the drawings, in which the pivotal axes 29, 43, 41, and 31 are substantially equally spaced as measured laterally, the plane of the road wheel varies less than one degree as the wheel moves through a maximum of four inches either upwardly or downwardly from the midposition thereof, the wheel tread partaking of no substantial lateral displacement with respect to the road bed.

It will be understood that the term "link" as used herein is intended in a sufficiently broad sense to include equivalent members functioning in a similar manner but not rigid. Thus in Figures 4 and 5 of the drawings modified arrangements of the invention are shown in which the lower link 22 of the preceding modifications is constituted by or replaced by a leaf spring assembly. In Figure 4 this leaf spring assembly, indicated at 55, is pivoted as indicated at 56 to a bracket 57 carried by the cross frame member 12, the opposite ends of the spring assembly being connected as at 60 and 61 to the respective wheel supporting members 20. In Figure 5 the leaf spring assembly 55 is illustrated as secured rigidly to the cross frame member 12.

While the arrangement shown in Figure 5 is somewhat more conventional and is possibly sturdier than that illustrated in Figure 4, the construction shown in Figure 4 is advantageous in some respects. Thus the pivotal connection between the leaf spring assembly and the frame permits the frame to remain in a substantially horizontal position even though the leaf spring is canted as occurs when one road wheel only rises on meeting an obstruction. Again, this construction provides a greater effective length of supporting link and a correspondingly flatter arc of movement of the point of connection between the leaf spring and either wheel supporting member 20, the natural stiffness and static friction of the spring assembly tending to cause pivotal movement of the same as a whole about the point of connection thereof to one of the wheel carrying members 20 when the other wheel carrying member rises or falls. Considered from another standpoint, the effective length of the leaf spring assembly is increased by this arrangement since it is permitted to flex over its entire length when either road wheel rises, thus contributing to the maintenance of substantially vertical movement of the wheel carrying members 20.

It will be appreciated that where the lower link is flexible as in the arrangement shown in Figures 4 and 5, some reorganization of the length of the upper link system may be required in order that the wheel carrying members may partake of the desired movement. The employment of a leaf spring is particularly desirable under circumstances in which the stability characteristic of such springs is preferable to the easier riding qualities of coil springs.

Various modifications of the structure hereinbefore described will occur to one skilled in the art to which the invention relates. For instance, while I prefer to employ one or more members 32 having pivotal connection with the link 28 and with the frame about vertically spaced parallel axes, the pivot point 31 of the link may be arranged to slide in a suitable laterally extending and generally horizontally disposed guideway. Similarly the point of pivotal connection 41 of the member 40 with the link 28 may move in a suitable arcuate guide formed in the bracket 35 or otherwise carried by the vehicle frame, it being essential only that the link 28 be supported for lateral bodily displacement suitably proportioned to the swinging movement of which the link partakes.

It will be appreciated that the bracket 35 forms in effect a portion of the vehicle frame, the link 28 being carried and guided solely by the frame. By the employment of a forked link connected with the frame at points spaced longitudinally of the latter, increased resistance to the fore and aft and to the torsional stresses applied to the wheel assembly is secured.

Having thus described the invention, what is claimed as new and desired to be secured by Letters Patent is:

1. In a motor vehicle, the combination with a vehicle frame, of steerable road wheels disposed at opposite sides of said frame, and means supporting said road wheels on said frame for independent rising and falling movement with respect thereto, said means comprising a pair of generally parallel vertically spaced links having articulated connection with each of said wheels and with said frame for swinging movement in generally vertical planes, the connection of one link of each pair with the frame providing for lateral bodily displacement of the link, the other link of each pair being pivoted to said frame for swinging movement about a fixed axis, and guide means associated with said first named link and acting between the frame and the link at a point intermediate the ends of the link to cause the said point to follow an outwardly directed path as the link rises from a midposition.

2. In a motor vehicle, the combination with a vehicle frame, of steerable road wheels disposed at opposite sides of said frame, and means supporting said road wheels on said frame for independent rising and falling movement with respect thereto, said means comprising a pair of generally parallel vertically spaced links having articulated connection with each of said wheels and with said frame for swinging movement in generally vertical planes, the connection of one link of each pair with the frame providing for displacement of the portion of the link so connected in an arcuate path, and guide means associated with said link and acting between the frame and the link at a point intermediate the ends of the link to cause the said point to follow an outwardly directed path as the link rises from a midposition, said guide means comprising a member pivotally connected to said link at the said point and to said frame outwardly of the said point.

3. In a motor vehicle, the combination with a vehicle frame, of steerable road wheels disposed at opposite sides of said frame, and means supporting said road wheels on said frame for independent rising and falling movement with respect thereto, said means comprising a pair of generally parallel vertically spaced links having articulated connection with each of said wheels and with said frame for swinging movement in generally vertical planes, the connection of one link of each pair with the frame providing for lateral bodily displacement of the link, and guide means associated with said link and acting between the frame and the link at a point intermediate the ends of the link to cause the said point to follow an outwardly directed path as the link rises from a midposition, said guide means comprising a member pivotally connected to said link at the said point and to said frame outwardly of the said point, said member and said link being normally disposed in a common generally horizontal plane and having the points of pivotal connection therefor approximately equally spaced as measured laterally.

4. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, a mounting supporting one of said links on said frame for concurrent generally vertical swinging movement and bodily lateral displacement, said links extending inwardly from the road wheel and being supported for swinging movement about substantially parallel axes, and means acting between said frame and said last named link for guiding the latter to cause the same to move in a definite predetermined path as the road wheel rises and falls, and spring means interposed between one of the links and the frame to yieldingly resist rising movement of the road wheel.

5. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, the lower of said links being substantially longer than the upper link, means affording a pivotal connection on a fixed axis between the lower of said links and the frame, and a mounting supporting the upper link on said frame for concurrent generally vertical swinging movement and bodily lateral displacement.

6. In a motor vehicle, the combination with a vehicle frame, of a road wheel, a road wheel carrying member, and means supporting said road wheel on said frame for rising and falling movement with respect thereto, said means comprising a pair of vertically spaced links each having pivotal connection with said frame and wheel carrying member, whereby said links may swing in a generally vertical plane as the wheel rises and falls, said links extending inwardly from the road wheel and being supported for swinging movement about substantially parallel axes, means acting between said frame and one of said links for effecting lateral displacement of the point of pivotal connection between the last named link and the frame as the link swings, and a direct pivotal connection between the other of said links and the frame.

7. In a motor vehicle, the combination with a vehicle frame, of a road wheel, a road wheel carrying member, and means supporting said road wheel on said frame for rising and falling movement with respect thereto, said means comprising an upper and a lower wheel supporting link pivoted to said frame and to said wheel carrying member on parallel, generally horizontal axes, the pivotal connection between one of said links and the frame comprising a member pivoted to each on parallel vertically spaced axes, and means associated with said frame and said last named link for engaging and constraining a portion of the latter intermediate the pivotal connections therefor to movement in a predetermined arcuate path.

8. In a motor vehicle, the combination with a vehicle frame, of a road wheel, a road wheel carrying member, and means supporting said road wheel on said frame for rising and falling movement with respect thereto, said means comprising an upper and a lower wheel supporting link pivoted to said frame and to said wheel carrying member on parallel, generally horizontal axes, the pivotal connection between one of said links and the frame comprising a member pivoted to each on parallel vertically spaced axes, and means associated with said frame and said last named link for constraining a portion of the latter intermediate the pivotal connections therefor to movement in a predetermined arcuate path, said last named means comprising a member having pivotal connection with the said intermediate portion of the link and having pivotal connection with the frame outwardly of the said intermediate portion of the link.

9. In a motor vehicle, the combination with a vehicle frame, of a road wheel, a road wheel carrying member, and means supporting said road wheel on said frame for rising and falling movement with respect thereto, said means comprising an upper and a lower wheel supporting link pivoted to said frame and to said wheel carrying member on parallel, generally horizontal axes, the pivotal connection between one of said links and the frame comprising a member pivoted to each on parallel vertically spaced axes, and means associated with said frame and said last named link for constraining a portion of the latter intermediate the pivotal connections therefor to movement in a predetermined arcuate path, said last named means comprising a member having pivotal connection with the said intermediate portion of the link and having pivotal connection with the frame outwardly of said intermediate portion of the link, said last named member and said link being disposed generally horizontally in the midposition thereof.

10. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, the lower of said links being substantially longer than the upper link and extending across the longitudinal center line of the frame, means affording a pivotal connection on a fixed axis between the lower of said links and the frame, a mounting supporting the upper link on said frame for concurrent generally vertical swinging movement and bodily lateral displacement, and a coil spring acting between the lower link and the frame to yieldingly resist rising movement of the wheel.

11. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, and a mounting supporting one of said links on said frame for concurrent generally vertical swinging movement and bodily lateral displacement, said mounting including a member pivoted to said frame and said link on vertically spaced, generally horizontal axes, and a second member pivoted to said link and outwardly thereof to said frame on axes parallel to said first named axes.

12. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, and a mounting supporting one of said links on said frame for concurrent generally vertical swinging movement and bodily lateral displacement, the other of said links comprising a leaf spring assembly.

13. In a motor vehicle, the combination with a vehicle frame, of a road wheel, a road wheel carrying member, and means supporting said road wheel on said frame for rising and falling movement with respect thereto, said means comprising a pair of vertically spaced links carried by said frame and pivotally connected with said wheel carrying member, the lower of said links being substantially longer than the upper link and comprising a leaf spring assembly, means affording a pivotal connection on a fixed axis between the lower of said links and the frame, and a mounting supporting the upper link on said frame for concurrent generally vertical swinging movement and bodily lateral displacement.

14. In a motor vehicle, the combination with a vehicle frame, of steerable road wheels disposed at opposite sides of said frame, and means supporting said road wheels on said frame for independent rising and falling movement with respect thereto, said means comprising a pair of generally parallel vertically spaced links having articulated connection with each of said wheels and with said frame for swinging movement in generally vertical planes, and means supporting at least one link of each pair on the frame for bodily displacement laterally thereof, said last named means including connections between the frame and spaced points on the said link constraining such points to movement in arcuate paths.

15. In a motor vehicle, the combination with a vehicle frame, of steerable road wheels disposed at opposite sides of said frame, and means supporting said road wheels on said frame for independent rising and falling movement with respect thereto, said means comprising a pair of vertically spaced links having articulated connection with each of said wheels and with said frame for swinging movement in generally vertical planes, said links extending inwardly from the road wheel and being supported for swinging movement about substantially parallel axes, and means supporting at least one link of each pair on the frame for bodily displacement laterally thereof, said last named means including connections between the frame and spaced points on the said link constraining such points to movement in arcuate paths.

16. In a motor vehicle, the combination with a vehicle frame, of steerable road wheels disposed at opposite sides of said frame, and means supporting said road wheels on said frame for independent rising and falling movement with respect thereto, said means comprising a pair of generally parallel vertically spaced links having articulated connection with each of said wheels and with said frame for swinging movement in generally vertical planes, and means supporting at least one link of each pair on the frame for bodily displacement laterally thereof to an extent varying with and determined by the extent of swinging movement of the links from a mid-position, said last named means including connections between said frame and spaced points on the said link for guiding the lateral displacement of the link in a path such that said points will describe different arcuate paths.

17. In a motor vehicle, the combination with a vehicle frame, of steerable road wheels disposed at opposite sides of said frame, and means supporting said road wheels on said frame for independent rising and falling movement with respect thereto, said means comprising a pair of vertically spaced links having articulated connection with each of said wheels and with said frame for swinging movement in generally vertical planes, said links extending inwardly from the road wheel and being supported for swinging movement about substantially parallel axes, and means supporting at least one link of each pair on the frame for bodily displacement laterally thereof to an extent varying with and determined by the extent of swinging movement of the links from a mid-position, said last named means including connections between said frame and spaced points on the said link for guiding the lateral displacement of the link in a path such that said points will describe different arcuate paths.

18. In a motor vehicle, the combination with a vehicle frame, of a road wheel, a road wheel carrying member, and means supporting said road wheel on said frame for rising and falling movement with respect thereto, said means comprising an upper and a lower wheel supporting link pivoted to said frame and to said wheel carrying member on parallel, generally horizontal axes, said links extending inwardly from said road wheel, the pivotal connection between one of said links and the frame comprising a pair of members pivoted to each on parallel axes, whereby the said link is guided to cause the same to move in a definite predetermined path as the road wheel rises and falls.

HANS HIERTA.